April 30, 1935.  H. S. BILDERBACK ET AL  1,999,230
ADJUSTABLE BEARING FOR CONVEYER HANGERS
Filed Aug. 4, 1931
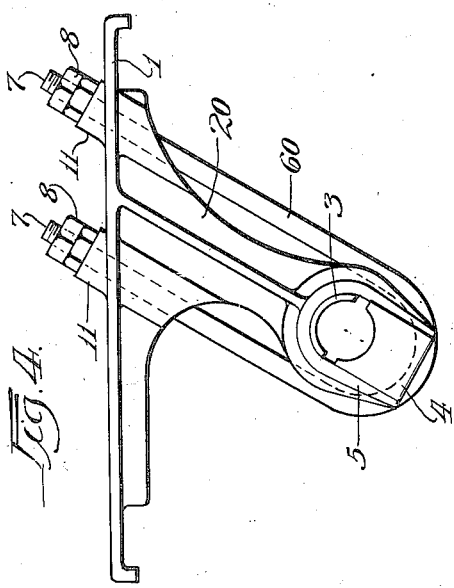
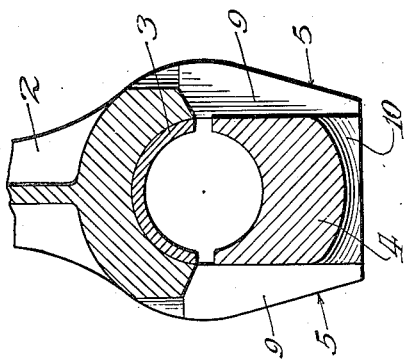
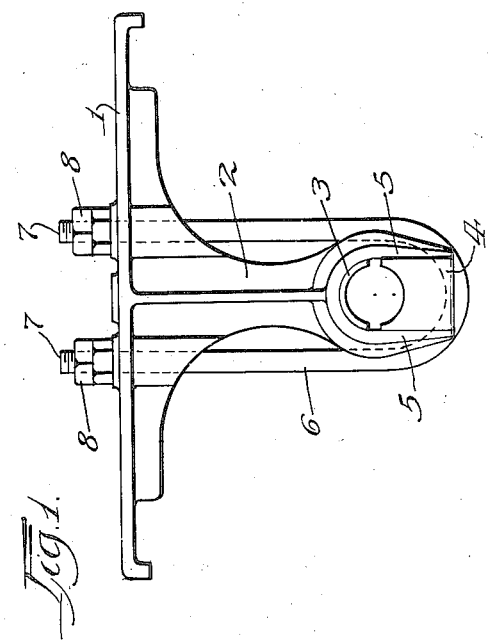
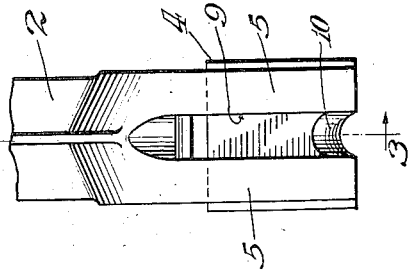

Patented Apr. 30, 1935

1,999,230

UNITED STATES PATENT OFFICE 1,999,230

ADJUSTABLE BEARING FOR CONVEYER HANGERS

Henry Sam Bilderback, Elk City, Okla., and Ida B. McCullough, Ballinger, Tex.

Application August 4, 1931, Serial No. 555,046

5 Claims. (Cl. 308—33)

One of the difficulties encountered in screw conveyers in which the axis of rotation of the screw or spiral is horizontal or inclined is due to the wear of the shafts or gudgeons and the bearings therefor which permits the screw or spiral to drop down from its normal position. The wear in conveyer bearings is rather rapid because the bearing surfaces come in contact with the material that is being conveyed, this material being often abrasive. It is quite necessary for efficient operation of the conveyer that the movable element be properly located with respect to the box or casing. If this element be too high up, there will always remain on the bottom of the casing a layer of material that is being conveyed, thus causing considerable resistance to movement across this layer of the material that is being carried along by the conveyer. However, if the movable element of the conveyer be initially placed at the right distance above the bottom of the casing or box, the excessive wear in the bearings and on the gudgeons or shafts will soon permit the movable element to drop down and strike the bottom of the box or casing and, in time, wear through the same.

The object of the present invention is to produce a simple and novel hanger for conveyer shafts or gudgeons in which compensation may be made for wear, as wear takes place; thus making it possible to maintain the axis of rotation in its initial central position in the box or casing and insure proper bearing support wherever such a hanger occurs.

A further object of the present invention is to produce a simple and novel hanger construction in which adjustment to take up wear in the bearings may be made while the conveyer is in operation.

The various features of novelty whereby our invention is characterized will hereinafter be pointed out with particularity in the claims; but, for a full understanding of our invention and of its objects and advantages, reference may be had to the following detailed description taken in connection with the accompanying drawing, wherein:

Figure 1 is a side view of one of our improved hangers; Fig. 2 is an edge view, on a larger scale than Fig. 1, of the lower portion of the hanger, with the saddle or support for the lower bearing removed; Fig. 3 is a section on line 3—3 of Fig. 2; and Fig. 4 is a view similar to Fig. 1, illustrating our improvements applied to a somewhat different type of hanger.

Referring to Figs. 1, 2 and 3 of the drawing, 1 and 2 represent a cross piece adapted to rest on the top of a conveyer box or casing, and the depending portion having at its lower end a bearing for a conveyer shaft or gudgeon, of a well known type of hanger. The present invention is not concerned with the details of the body portion of the hanger, the particular hanger illustrated being intended simply to show the manner in which the invention may be applied to hangers of this general type.

In the lower end of the member 2 is the upper part 3 of a bearing for a shaft or gudgeon. Co-operating with the member 3 is a lower bearing member 4 disposed underneath the same. In accordance with our invention, the lower bearing member is so mounted and supported that it may be adjusted up and down through a considerable distance. Substantially all of the wear in bearings of this kind occurs in the lower half of the bearing so that, by moving the lower bearing member up from time to time, the shaft or gudgeon will be caused to retain its original alignment in the box or casing.

In the arrangement shown, the member 2 has depending therefrom four guide pieces 5, arranged in pairs on opposite sides of the upper bearing member; the guides of each pair being spaced apart from each other so as to leave an opening or passage between the same. The lower bearing member, which is preferably in the form of a block, deep enough in the vertical direction to permit it to be worn down considerably before requiring replacement, fits slidably between the two pairs of guides. This lower bearing member is supported as in a saddle, by a U-shaped member 6 whose arms extend upwardly on opposite sides of the part 2 of the hanger through the upper or supporting part 1. A considerable length of each of the arms of the member 6, at the upper end, is screw-threaded, as indicated at 7, and, on these screw-threaded portions, are nuts 8 which rest on top of the member 1 of the hanger. The slot or passage 9, between the guides of each pair or set, is wide enough to receive the member 6, so that this member can be drawn up by means of the nuts, carrying with it the lower bearing member. The lower bearing member is preferably provided in the bottom with a groove 10 to receive the yoke or cross piece of the saddle member.

It will thus be seen that, as wear takes place, the bearing may be adjusted to compensate therefor. Also, since the adjustment is made through the nuts 8, which are above the top of the hanger, the bearing may be adjusted while the conveyer is running.

The thrust on a conveyer shaft or gudgeon is not directly downward, but is at an angle to the vertical, and, therefore, it is preferable that the lower bearing member be movable from and toward the upper bearing member at such acute angle. This can, of course, be accomplished in various ways, perhaps the simplest of which is illustrated in Fig. 4. The hanger shown in Fig. 4 is like that just described, except that the depending member 20, corresponding to the member 2, is inclined to the vertical in the direction of the thrust on the shaft or gudgeon. The bearing may be exactly the same as that heretofore described, excepting that it is bodily shifted about the axis of rotation of the shaft or gudgeon through an angle corresponding to the inclination of the hanger member 20. Furthermore, the saddle or support, or the top of the hanger, or both, must be modified so that the nuts, when turned, will exert a direct pull in the direction of the length of the arms of the saddle or support. In the arrangement shown, the U-shaped support 60 has one arm that is longer than the other, and the top of the hanger is provided with lugs or bosses 11 whose upper faces are inclined so as to stand at right angles to the arms of the support.

While we have illustrated and described with particularity only a single preferred form of our invention, we do not desire to be limited to the exact structural details thus illustrated and described; but intend to cover all forms and arrangements which come within the definitions of our invention constituting the appended claims.

We claim:

1. In combination, a hanger for a conveyer shaft or gudgeon having fixed in the lower end the upper member of the bearing for the shaft or gudgeon, a lower bearing member, said bearing members being constructed and arranged so as to be spaced a considerable distance apart when engaged with the shaft or gudgeon, guide means on the hanger engaged with said lower bearing member and positioned to permit the lower bearing member to be slid along the same toward the upper bearing member as wear takes place in the bearing and on the shaft or gudgeon, and means extending to the top of the hanger to support the lower bearing member in the various working positions into which it may be brought along said guide means.

2. In combination, a hanger for a conveyer shaft or gudgeon having fixed in the lower end the upper member of a bearing for the latter, guide means on the hanger depending below the aforesaid bearing member, a lower bearing member engaged with said guide means and slidable along the same toward the upper bearing member as wear takes place in the bearing and on the shaft or gudgeon, said bearing members being constructed and arranged so as to be spaced a considerable distance apart when engaged with the shaft or gudgeon, an element extending from the top of the hanger to said lower bearing member and supporting the latter, and coacting means between the upper end of the said element and the hanger to support the said element and permit it to be adjusted in the lengthwise direction.

3. In combination, a hanger for a conveyer shaft or gudgeon having fixed in the lower end the upper member of a bearing for the latter, guide means on the hanger depending below the aforesaid bearing member, a lower bearing member engaged with said guide means and slidable along the same toward the upper bearing member as wear takes place in the bearing and on the shaft or gudgeon, said bearing members being constructed and arranged so as to be spaced a considerable distance apart when engaged with the shaft or gudgeon, a U-shaped member passing underneath and engaged with the lower bearing member and having its arms extending upwardly to the top of the hanger, the arms having long screw-threaded portions at their upper ends, and nuts on the screw-threaded portions of the arms and engaged with the top of the hanger.

4. In combination, a hanger for a conveyer shaft or gudgeon having in the lower end the upper member of a bearing for the latter, guide means on the hanger depending below the aforesaid bearing member, a lower bearing member engaged with said guide means and movable along the same from and toward the upper bearing member, said guide means having slots extending lengthwise thereof, means extending through said slots and underlying the lower bearing member to support the latter, and means for raising and lowering the last-mentioned means and holding it in any desired position of adjustment.

5. In combination, a hanger for a conveyer shaft or gudgeon having in the lower end a stationary upper member of a bearing for the latter, stationary guides fixed to and extending downwardly from said hanger, a lower bearing member arranged between and slidable lengthwise of said guides, said lower bearing member having on opposite sides flat parallel faces and said guides having flat parallel faces engaged with the said faces on the lower bearing member, and means for raising and lowering the lower bearing member interlocked with the guides and with the lower bearing member so as to permit said means to move lengthwise of the guides while holding the lower bearing member against lateral displacement out of the space between the guides.

HENRY SAM BILDERBACK.
IDA B. McCULLOUGH.